United States Patent [19]

Ramanujan et al.

[11] Patent Number: 5,214,770
[45] Date of Patent: May 25, 1993

[54] SYSTEM FOR FLUSHING INSTRUCTION-CACHE ONLY WHEN INSTRUCTION-CACHE ADDRESS AND DATA-CACHE ADDRESS ARE MATCHED AND THE EXECUTION OF A RETURN-FROM-EXCEPTION-OR-INTERRUPT COMMAND

[75] Inventors: Raj K. Ramanujan, Leominster; Peter J. Bannon, Acton, both of Mass.; Simon C. Steely, Jr., Hudson, N.H.

[73] Assignee: Digital Equipment Corporation, Maynard, Mass.

[21] Appl. No.: 541,485

[22] Filed: Jun. 21, 1990

Related U.S. Application Data

[63] Continuation of Ser. No. 176,728, Apr. 1, 1988, abandoned.

[51] Int. Cl.⁵ .................. G06F 9/312; G06F 9/445; G06F 13/00
[52] U.S. Cl. .................. 395/425; 364/DIG. 1; 364/243.4; 364/243.41; 364/255.5; 364/259.2; 364/263.2
[58] Field of Search ... 364/200 MS File, 900 MS File; 395/425

[56] References Cited

U.S. PATENT DOCUMENTS

| | | | |
|---|---|---|---|
| 3,979,726 | 9/1976 | Lange et al. | 364/200 |
| 4,208,716 | 6/1980 | Porter et al. | 395/425 |
| 4,228,503 | 10/1980 | Waite et al. | 364/200 |
| 4,295,193 | 10/1981 | Pomerene | 364/200 |
| 4,332,010 | 5/1982 | Messina et al. | 364/200 |
| 4,392,200 | 7/1983 | Arulpragasam et al. | 364/200 |
| 4,400,770 | 8/1983 | Chan et al. | 364/200 |
| 4,426,682 | 1/1984 | Riffe et al. | 364/200 |
| 4,481,573 | 11/1984 | Fukunaga et al. | 364/200 |
| 4,493,026 | 1/1985 | Olnowich | 364/200 |
| 4,502,110 | 2/1985 | Saito | 364/200 |
| 4,525,777 | 6/1985 | Webster et al. | 364/200 |
| 4,597,044 | 6/1986 | Circello | 364/200 |
| 4,701,844 | 10/1987 | Thompson et al. | 364/200 |
| 4,713,755 | 12/1987 | Worley, Jr. et al. | 395/375 |
| 4,750,112 | 6/1988 | Jones et al. | 364/200 |
| 4,875,160 | 10/1989 | Brown, III | 364/200 |
| 4,899,275 | 2/1990 | Sachs et al. | 364/200 |
| 4,926,317 | 5/1990 | Wallach et al. | 364/200 |
| 4,933,835 | 6/1990 | Sachs et al. | 364/200 |

OTHER PUBLICATIONS

IBM Technical Disclosure Bulletin; "Shared Castout Buffer"; vol. 28, No. 3; Aug. 1985; pp. 1169-1174.

Primary Examiner—Thomas C. Lee
Assistant Examiner—Krisna Lim
Attorney, Agent, or Firm—Kenyon & Kenyon

[57] ABSTRACT

A method and apparatus for optimizing the performance of a multiple cache system computer having separate caches for data and instructions in which all writes to the data cache are monitored. If the address tag of the item being written matches one of a list of tags representing valid instructions currently stored in the instruction cache, a flag called I_FLUSH_ON_REI is set. Until this flag is set, REI (Return from Exception or Interrupt) instructions will not flush the instruction cache. When the flag is set, an REI command will also flush or clear the instruction cache. Thus, the instruction cache is only flushed when an address referenced by an instruction is modified, so as to reduce the number of times the cache is flushed and optimize the computer's speed of operation.

4 Claims, 2 Drawing Sheets

SYSTEM FOR FLUSHING INSTRUCTION-CACHE ONLY WHEN INSTRUCTION-CACHE ADDRESS AND DATA-CACHE ADDRESS ARE MATCHED AND THE EXECUTION OF A RETURN-FROM-EXCEPTION-OR-INTERRUPT COMMAND

This application is a continuation, of application Ser. No. 07/176,728, filed Apr. 1, 1988 now abandoned.

FIELD OF THE INVENTION

The present invention relates to the field of digital computers and their architecture. More particularly, it relates to cache memories used in computer systems.

BACKGROUND OF THE INVENTION

Some central processing units (CPUs) with high operating speeds require memory devices with extremely rapid access and retrieval characteristics. Memories which fulfill these requirements include small storage capacity, exceedingly fast access and retrieval random access memories (RAMs), commonly known as cache memories. The caches are used to store data and instructions which the CPU requires immediately. A larger, main memory stores the remaining portion of the currently running programs and supplies both the CPU and the cache memories with data and instructions which cannot be stored within the small cache memories. This system of memory hierarchy, with the fastest memories most closely linked to the CPU, has enabled computer systems to achieve very high operational speeds.

One known implementation of cache memories uses two separate caches, a data cache and an instruction cache, for supporting CPU operations - one cache supporting data operations and the other supporting instruction operations. This arrangement increases the computer's operating speed, but raises the possibility that data will be changed or updated in the data cache while it is also contained in the instruction cache. This can result in improper instructions being executed. The term "improper" is used to denote instructions that have not been updated.

It is an object of this invention to insure synchronism between the contents of separate data and instruction caches with a minimum amount of clearing of either cache.

SUMMARY OF THE INVENTION

These objects and others are fulfilled by the present invention wherein a memory store of the addresses contained in the instruction cache is maintained. When data is written to the data cache, a comparison is made between the contents of the address store and the new data. If there is a match, the next time an instruction called Return-from-Exception-or-Interrupt is executed (REI), the instruction cache is cleared. In this manner, the instruction cache is only cleared when there is a chance that a stale instruction will be executed. Advantageously, the present invention uses an instruction which already exists in the system.

These and other objects and advantages of the invention will appear more clearly from the following specification in connection with the accompanying drawings, in which:

DETAILED DESCRIPTION

Figure 1:
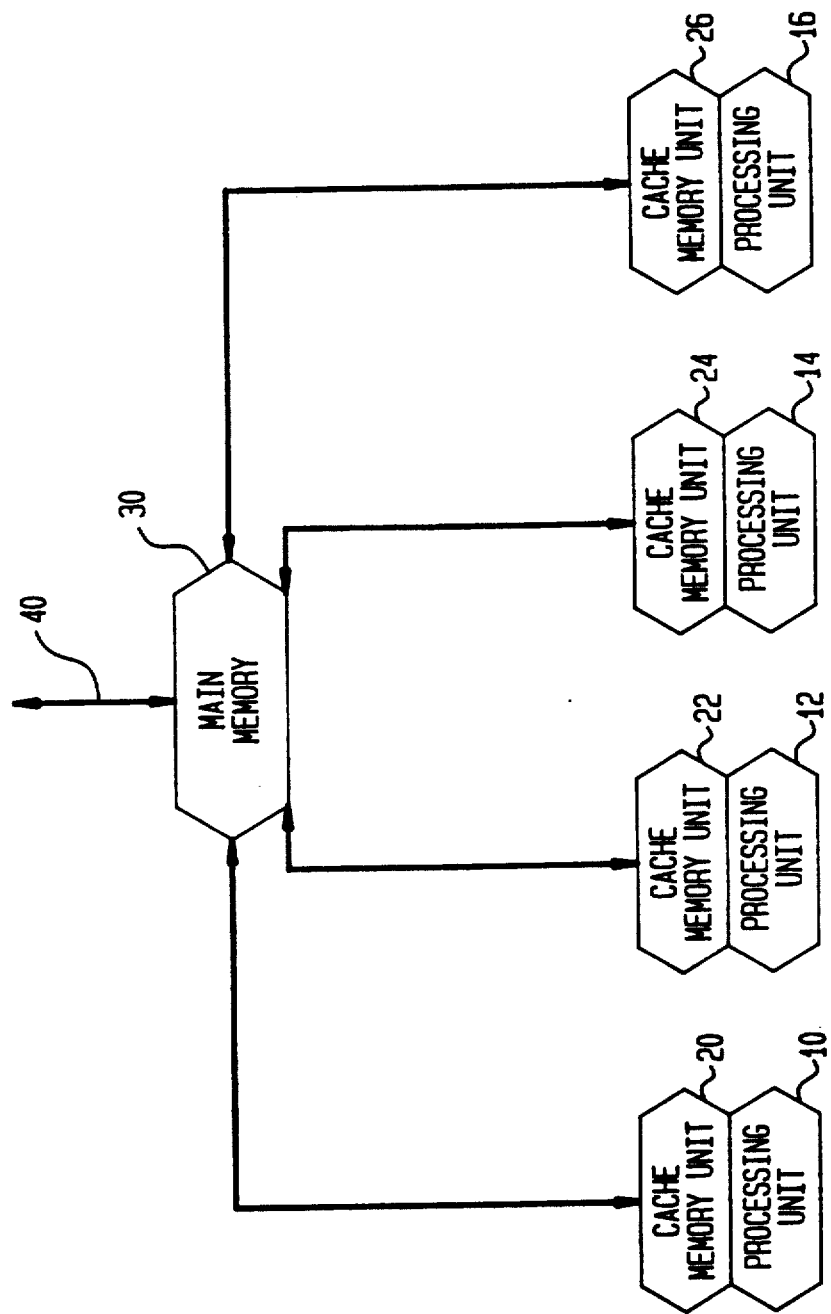
FIG. 1 shows a block diagram of a computer system which uses the present invention.

The overall operating environment of the present invention is shown in FIG. 1, where a multiprocessor computer system 1 is depicted. A plurality of processing units, in this embodiment four, numbered respectively 10, 12, 14 and 16 are connected to cache memory units numbered 20, 22, 24 and 26. The cache memory units 20, 22, 24, 26 receive and transmit data to main memory 30. Finally, main memory 30 receives and transmits data to various input/output devices (not shown) over input/output bus 40.

Figure 2:
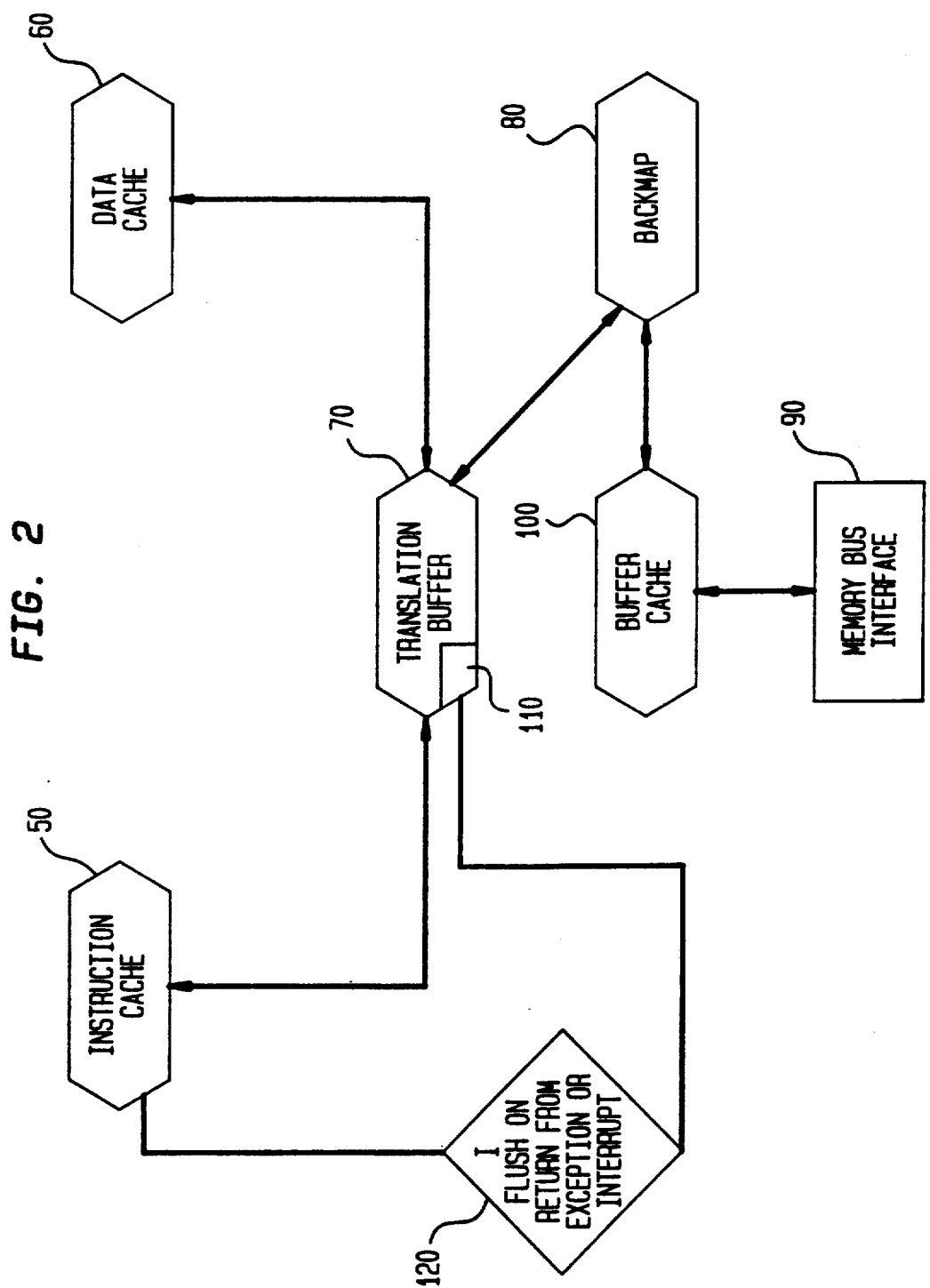
FIG. 2 is a block diagram of a cache memory unit of the computer system of FIG. 1.

A single cache memory unit will be described in terms of its functional components, as seen in FIG. 2. Here, cache memory unit 20 is broken down into instruction cache 50, data cache 60, translation buffer 70, backmap 80, memory bus interface 90, buffer cache 100 and I-cache PA tag store 110. It should be noted that these components need not be contained within a single monolithic unit. Rather, the components can be located on a plurality of modules and circuit boards. As their functions are so closely interrelated, however, they are treated as a unit for purposes of discussion.

The data cache 60 is a 4 kByte, direct mapped, virtually addressed cache and is used for reading and writing data stream data. Its access time is on the order of 1 cycle.

Instruction cache 50 is also a 4 kByte, direct mapped, virtually addressed cache with virtual address tags. It is used to fetch instructions to be put in the instruction stream and has a 1 cycle access time.

Both instruction cache 50 and data cache 60 are connected to Translation Buffer 70. Translation buffer 70 is direct mapped and contains 4 k entries divided evenly between process and system space. It is used to translate virtual addresses to physical addresses for all data cache references and for instruction cache misses. It also stores physical tags for all instruction cache entries.

Coupled to translation buffer 70 is the buffer cache 100. Buffer cache 100 is 1 MByte in size, direct mapped, and physically addressed with an access time of 4 cycles. Buffer cache 100 is much larger than either instruction cache 50 or data cache 60 and the system is arranged so that the contents of the two smaller caches are always a proper subset of the larger one. Thus, when an invalidate or other request is received from Memory Bus Interface 90, if the data or instruction cannot be found in buffer cache 100 there is no need to check for its presence in either the instruction or data caches 50, 60.

Backmap 80 is also coupled to the translation buffer 70 and is used to prevent synonyms in the data cache. The definition of synonyms in this context is two virtual addresses which have the same physical address.

Instructions tend to be used sequentially. In other words, if the first instruction in a long program is used it is very likely that the next instruction in the program will also be required. Consequently, instructions are generally prefetched and put into a pipeline for use by the CPU.

With two caches, the possibility exists that the same data might appear in both caches, and a write occurs to the data cache 60 to change this data. In this situation, improper data could be unintentionally processed. To send the new data to data cache 60 and simultaneously update the instruction cache 50 with that data is not practical, as it would slow the system's speed of operation too much and would also be expensive in terms of hardware.

It was contemplated to flush the instruction cache 50 every time a write to the data cache 60 occurs and the same data was present in the instruction cache 50. A known microcode instruction already in use is called Return from Exception or Interrupt (REI) that has the property of synchronizing the instruction stream and instruction stream traffic by purging the pipeline of instructions which have already been taken from the instruction cache. This instruction is described in the "Vax Architecture Handbook", 1986, p. 9-56, herein incorporated by reference. By requiring that an REI be executed after a write to the data cache and before execution of the modified instruction stream, it is assured that no stale instructions are executed. By flushing the instruction cache 50 (along with the pipeline) upon an REI command, the possibility of executing improper instructions is completely eliminated. However this method would result in flushing the instruction cache 50 too frequently, even when such action was not truly necessary and thereby slow the system down.

In order to minimize the number of times that the instruction cache 50 is flushed, but still maintain the proper data, the present invention provides a tag store 110 of physical addresses for every block of data contained in the instruction cache 50. The tag store 110 is associated with the translation buffer 70. The tags indicate all the physical addresses of the data in the instruction cache 50.

When data is placed in the data stream its physical address tag is compared to the tag store in the translation buffer 70. If a match occurs this indicates that the data contained in one of the addresses referred to by the instruction cache 50 is being changed or written over by new data. The occurrence of a match sets a hardware bit called the I-CACHE-FLUSH-ON-REI flag 120. When this flag is on, it indicates that the next time an REI instruction is executed, instruction cache 50 should be flushed. If the flag is not set when an REI is executed, the instruction cache 50 will not be flushed. In this manner, the cache is only flushed when the contents of the instruction cache 50 is actually changed. It should be remembered that the look-ahead/pipeline traffic in the instruction stream is also cleared by the REI instruction, thereby assuring synchronicity between the instruction and data caches. Finally, when instruction cache 50 is flushed, the I-CACHE-FLUSH-ON REI bit is also cleared, allowing for the next occurrence of the same situation.

In an alternative embodiment, each block in instruction cache 50 will have a separate and distinct I-CACHE-FLUSH-ON-REI flag 120. In this embodiment, when a write occurs, the address of the write will be compared to all of the addresses of the data blocks in the instruction cache 50. If a match occurs, the flag for that particular address block will be set.

However, whenever an instruction cache block is replaced or modified, the corresponding flag, if it is set, can be cleared as the instruction cache will no longer contain the block that has changed.

In this instance it is possible that a flag for a particular block could be set, the particular "flagged" block could then be displaced or changed, thus clearing the flag as the instruction cache would not contain the changed block and, when a subsequent REI instruction occurred, no flags would be set so the instruction cache would not be flushed. This approach increases the system's overhead by requiring additional flags for each separate data block stored in the instruction cache. However, this disadvantage is compensated for by reducing the number of instruction cache flushes.

Two further alternatives are possible with this approach. First, if an REI instruction is executed, and any flag is on, the entire instruction cache can be flushed. Second, only the blocks which are flagged could be flushed, leaving the remainder of the blocks untouched.

The present invention reduces the number of instruction cache flushes by a very large percentage in comparison with the other mentioned methods, thereby increasing the system's speed of operation in a significant manner. In tests, the overall occurrence of instruction cache flushes has been reduced by 99% using the present invention.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

We claim:

1. A method for synchronizing data and instructions in a computer having a translation buffer, an instruction cache arranged to store blocks of information, a data cache, a tag store, and a Return from Exception or Interrupt command, the method comprising the steps of:
   storing, in the tag store, first addresses corresponding to the blocks of information contained in the instruction cache;
   utilizing a comparator to compare said stored first addresses with second addresses of data being written to said data cache by the computer;
   setting an indicator bit if a match of any of said first addresses with any of said second addresses is detected in said comparing step; and
   clearing said instruction cache when said indicator bit is set and upon execution of said Return from Exception or Interrupt command.

2. A method of claim 1, wherein the indicator bit comprises a flag for each said block contained in the instruction cache, said flag being set to indicate said match of said first and second addresses for a corresponding block in the instruction cache, and wherein the step of clearing said instruction cache includes clearing selected individual blocks having a flag that is set.

3. An apparatus for insuring synchronism between an instruction cache and a data cache of a computer, the apparatus comprising:
   means for storing first addresses referred to by said instruction cache;
   means for comparing addresses in the means for storing first addresses, said means for comparing addresses operated to compare said first address with second addresses of data being written to said data cache by the computer;

means for setting and storing, coupled to said means for comparing addresses, operating to set and store a flag bit when a match between any one of said first addresses and any one of said second addresses occurs; and means responsive to a Return from Exception or Interrupt command coupled to said instruction cache and said means for setting and storing, said means responsive to a Return from Exception or Interrupt command operating to clear the instruction cache in response to the Return from Exception or Interrupt command when the flag bit is set.

4. The apparatus of claim 3, wherein:

said means for setting and storing, operating to set and store a flag indicative of a match of at least one of said first addresses with at least one of said second addresses in said means for comparing addresses; and said means responsive to a Return from Exception of Interrupt command operating to clear the instruction cache by clearing that portion of said instruction cache containing data corresponding to the at least one of said first addresses identified as a match.

* * * * *